United States Patent
Robertson et al.

(10) Patent No.: US 12,344,558 B2
(45) Date of Patent: Jul. 1, 2025

(54) POLYCRYSTALLINE DIAMOND COMPACT CUTTING ELEMENTS, EARTH-BORING TOOLS INCLUDING SUCH CUTTING ELEMENTS, AND RELATED METHODS OF MAKING AND USING SAME

(71) Applicant: Baker Hughes Oilfield Operations LLC, Houston, TX (US)

(72) Inventors: Andrew Robertson, The Woodlands, TX (US); Nicholas J. Lyons, Houston, TX (US)

(*) Notice: Subject to any disclaimer, the term of this patent is extended or adjusted under 35 U.S.C. 154(b) by 170 days.

(21) Appl. No.: 17/816,789

(22) Filed: Aug. 2, 2022

(65) Prior Publication Data
US 2024/0043343 A1 Feb. 8, 2024

(51) Int. Cl.
- *C04B 35/528* (2006.01)
- *B22F 7/06* (2006.01)
- *C04B 35/645* (2006.01)

(52) U.S. Cl.
CPC ............ *C04B 35/528* (2013.01); *B22F 7/064* (2013.01); *C04B 35/645* (2013.01); *C04B 2235/427* (2013.01); *C04B 2235/656* (2013.01)

(58) Field of Classification Search
CPC ............... C04B 35/528; C04B 35/645; C04B 2235/427; C04B 2235/656; C04B 2237/12; C04B 2237/122; C04B 2237/124; C04B 2237/125; C04B 2237/363; C04B 2237/401; C04B 37/026; C04B 2237/61; B22F 7/064; B22F 7/062; B22F 3/14; B22F 2005/001; C22C 26/00
See application file for complete search history.

(56) References Cited

U.S. PATENT DOCUMENTS

| | | |
|---|---|---|
| 8,191,658 B2 | 6/2012 | Schmitz et al. |
| 8,267,204 B2 | 9/2012 | Lyons |
| 9,889,540 B2 | 2/2018 | Bird et al. |
| 2012/0103699 A1 | 5/2012 | Yu et al. |

(Continued)

FOREIGN PATENT DOCUMENTS

WO 2021/247684 A1 12/2021

OTHER PUBLICATIONS

International Search Report for application No. PCT/US2023/071153 dated Nov. 24, 2023, 3 pages.

(Continued)

*Primary Examiner* — Nathan L Van Sell
(74) *Attorney, Agent, or Firm* — Baker Hughes Company

(57) ABSTRACT

Methods of forming a cutting element include sintering diamond particles at a temperature of at least about 1400° C. under a pressure of at least about 10 GPa in the absence of a metal solvent catalyst so as to form a polycrystalline diamond compact (PDC), providing a barrier material over at least a portion of the PDC, providing a carbide material and a metal binder comprising at least one transition metal element over the barrier material and the PDC, and performing a second sintering process comprising sintering the carbide material, the metal binder, the barrier material, and the PDC at a temperature of at least about 1400° C. under a pressure of at least about 5 GPa to form the cutting element. At least a portion of the PDC proximate an exposed exterior surface of the PDC may be at least substantially free of the metal binder.

13 Claims, 8 Drawing Sheets

(56) References Cited

U.S. PATENT DOCUMENTS

| | | |
|---|---|---|
| 2013/0263519 A1* | 10/2013 | Lin ................... B24D 99/005 51/297 |
| 2014/0013913 A1 | 1/2014 | Bao |
| 2015/0027787 A1 | 1/2015 | Scott et al. |
| 2015/0273661 A1* | 10/2015 | Bird ................... E21B 10/55 51/307 |
| 2016/0347673 A1* | 12/2016 | Choi ................... C04B 35/528 |
| 2019/0119989 A1 | 4/2019 | Lyons et al. |
| 2019/0242191 A1* | 8/2019 | Jiang ................... C04B 35/645 |
| 2019/0242193 A1 | 8/2019 | Mukhopadhyay et al. |
| 2020/0063499 A1 | 2/2020 | Keller |

OTHER PUBLICATIONS

International Written Opinion for application No. PCT/US2023/071153 dated Nov. 24, 2023, 6 pages.

* cited by examiner

POLYCRYSTALLINE DIAMOND COMPACT CUTTING ELEMENTS, EARTH-BORING TOOLS INCLUDING SUCH CUTTING ELEMENTS, AND RELATED METHODS OF MAKING AND USING SAME

TECHNICAL FIELD

This disclosure relates generally to cutting elements for earth-boring tools and related earth-boring tools and methods. More specifically, disclosed embodiments relate to techniques for producing a cutting element including a thermally stable polycrystalline diamond cutting table and to related cutting elements and earth-boring tools.

BACKGROUND

Earth boring tools for forming wellbores in subterranean earth formations may include a plurality of cutting elements secured to a body. For example, fixed cutter earth boring rotary drill bits (also referred to as "drag bits") include a plurality of cutting elements that are fixedly attached to a bit body of the drill bit. Similarly, roller cone earth boring rotary drill bits include cones that are mounted on bearing pins extending from legs of a bit body such that each cone is capable of rotating about the bearing pin on which the cone is mounted. A plurality of cutting elements may be mounted to each cone of the drill bit.

The cutting elements used in earth boring tools often include polycrystalline diamond compact (PDC) cutters, which are cutting elements that include a polycrystalline diamond (PCD) material. Such polycrystalline diamond cutting elements are formed by sintering and bonding together relatively small diamond grains or crystals under conditions of high pressure and high temperature, typically in the presence of a metal-solvent catalyst (typically including a transition metal element, such as cobalt, iron, or nickel, or an alloy or mixture having such elements), to form a layer of polycrystalline diamond material (e.g., a diamond table, a cutting table, etc.) on a cutting element substrate. These processes are often referred to as high pressure/high temperature (HPHT) processes. Catalyst material may be mixed with the diamond grains to reduce the amount of oxidation of diamond by oxygen and carbon dioxide during an HPHT process and to promote diamond to diamond bonding.

The cutting element substrate may include a cermet material (i.e., a particle matrix composite material comprising a hard ceramic particle phase embedded within a metal matrix phase) such as cobalt cemented tungsten carbide. In such instances, the cobalt (or other catalyst material) in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HPHT process.

Upon formation of a diamond table using an HPHT process, catalyst material may remain in interstitial spaces between the grains or crystals of diamond in the resulting polycrystalline diamond table. The presence of the catalyst material in the diamond table may contribute to thermal damage in the diamond table when the cutting element is heated during use due to friction at the contact point between the cutting element and the formation.

Conventional PDC fabrication relies on the catalyst that sweeps through the compacted diamond feed during HPHT synthesis. Traditional catalysts are cobalt-based with varying amounts of nickel, tungsten, and chromium to facilitate diamond intergrowth between the compacted diamond material. However, in addition to facilitating the formation of diamond to diamond bonds during HPHT sintering, these catalysts also undesirably facilitate the formation of graphite from diamond at elevated temperatures that arise while using of the cutting element during a drilling operation, for example. Formation of graphite in the PCD material can rupture diamond necking regions (i.e., particle boundaries) due to an approximate 57% volumetric expansion during the transformation. This phase transformation is known as "back conversion" or "reverse graphitization," and typically occurs at temperatures exceeding 750° C., which temperatures can be reached at and near the cutting edge of a cutting element during drilling applications. This mechanism, coupled with mismatch of the coefficients of thermal expansion and elastic moduli of the metallic phase and diamond as temperatures exceed 600° C., is believed to account for a significant part of degradation of the general performance criteria known as "thermal stability." From experimental wear conditions, "back conversion" appears to dominate impairment of the thermal stability of a PCD, promoting premature degradation of the diamond table at and near the cutting edge and, therefore, performance.

To reduce problems associated with different rates of thermal expansion and with back conversion in polycrystalline diamond cutting elements, so called "thermally stable" polycrystalline diamond (TSD) cutting elements have been developed. A TSD cutting element may be formed by leaching the catalyst material (e.g., cobalt) out from interstitial spaces between the diamond grains in the diamond table using, for example, an acid. Substantially all of the catalyst material may be removed from the diamond table, or only a portion may be removed. TSD cutting elements in which substantially all catalyst material has been leached from the diamond table have been reported to be thermally stable up to temperatures of about 1,200° C. It has also been established, however, that fully leached diamond tables are relatively more brittle and vulnerable to shear, compressive, and tensile stresses than non-leached diamond tables. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which only at least a portion of the catalyst material on the cutting face, and in some instances along a sidewall, has been leached from the diamond table.

Thermally stable pure diamond tables formed by sintering and bonding small diamond grains under conditions of ultra-high pressure and high temperature in the absence of conventional catalysts have been shown to have equivalent to better cutting performance and higher thermal stability than leached diamond tables. However, the absence of any metal constituents in the diamond table makes it difficult to secure a pure diamond table to a supporting substrate and a bit body. Pure diamond tables are also relatively more brittle and vulnerable to shear, compressive, and tensile stresses than are non-leached diamond tables.

BRIEF SUMMARY

Some embodiments of the present disclosure include a method of forming a cutting element. The method may include performing a first sintering process including sintering discrete diamond particles at a temperature of at least about 1400° C. under a pressure of at least about 10 GPa in the absence of a metal solvent catalyst to form direct diamond-to-diamond bonds between the discrete diamond particles so as to form a polycrystalline diamond compact, providing a carbide material and a metal binder comprising at least one transition metal element on the polycrystalline diamond compact, and performing a second sintering process comprising sintering the carbide material, the metal binder, and the polycrystalline diamond compact at a temperature of at least about 1400° C. under a pressure of at least about 5 GPa to form a supporting substrate comprising the carbide material and the metal binder attached to the polycrystalline diamond compact. At least a portion of the polycrystalline diamond compact proximate an exposed exterior surface of the polycrystalline diamond compact may be at least substantially free of the metal binder.

Additional embodiments of the present disclosure include a cutting element for an earth-boring tool. The cutting element may include a polycrystalline diamond compact including inter-bonded diamond particles with interstitial regions between the inter-bonded diamond particles, a supporting substrate comprising a carbide material and a metal binder including a metal solvent catalyst sintered in situ to the cutting table, and a barrier material between the supporting substrate and the cutting table. At least a volume of the cutting table adjacent an exterior cutting surface thereof may be at least substantially free of a metal solvent catalyst in the interstitial regions in the volume.

Some embodiments of the present disclosure include a method of forming a polycrystalline diamond compact. The method may include providing discrete diamond particles, providing a barrier material over at least a portion of the discrete diamond particles; providing a carbide material and a metal binder over the barrier material, and sintering the carbide material, the metal binder, the barrier material, and the discrete diamond particles at a temperature of at least about 1400° C. under a pressure of at least about 10 GPa to form direct diamond-to-diamond bonds between the discrete diamond particles so as to form a polycrystalline diamond compact attached to a supporting substrate comprising the carbide material and the metal binder, the barrier material between the polycrystalline diamond compact and the supporting substrate. At least a portion of the polycrystalline diamond compact proximate an exposed exterior surface of the polycrystalline diamond compact may be at least substantially free of the metal binder.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
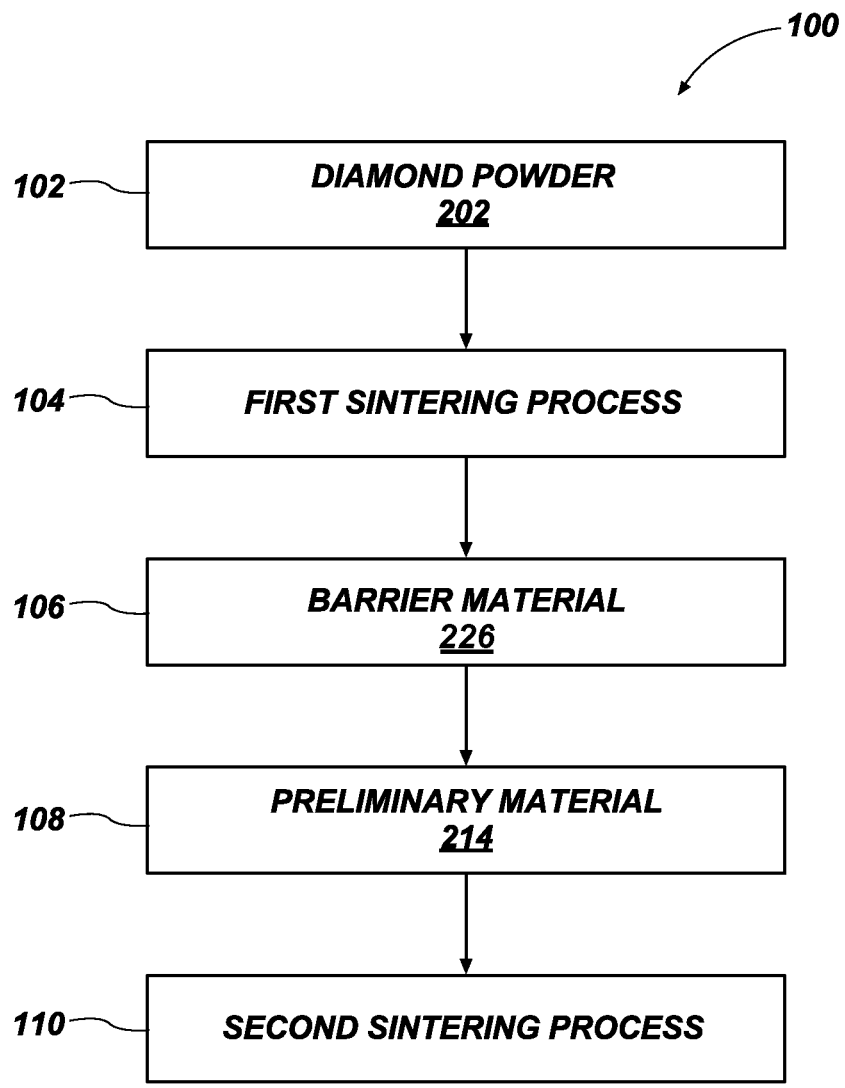
FIG. 1 is a simplified flow diagram depicting a method of forming a cutting element, according to embodiments of the disclosure.

The following description provides specific details, such as specific shapes, specific sizes, specific material compositions, and specific processing conditions, in order to provide a thorough description of embodiments of the present disclosure. However, a person of ordinary skill in the art would understand that the embodiments of the disclosure may be practiced without necessarily employing these specific details. Embodiments of the disclosure may be practiced in conjunction with conventional fabrication techniques employed in the industry. In addition, the description provided below does not form a complete process flow for manufacturing a cutting element or earth-boring tool. Only those process acts and structures necessary to understand the embodiments of the disclosure are described in detail below. Additional acts to form a complete cutting element or a complete earth-boring tool from the structures described herein may be performed by conventional fabrication processes.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the terms "comprising," "including," "having," and grammatical equivalents thereof are inclusive or open-ended terms that do not exclude additional, unrecited elements or method acts, but also include the more restrictive terms "consisting of" and "consisting essentially of" and grammatical equivalents thereof.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property or condition may be at least 90.0 percent met, at least 95.0 percent met, at least 99.0 percent met, at least 99.9 percent met, or even 100.0 percent met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "earth-boring tool" means and includes any type of bit or tool used for drilling during the formation or enlargement of a wellbore and includes, for example, rotary drill bits, percussion bits, core bits, eccentric bits, bi-center bits, reamers, mills, drag bits, roller-cone bits, hybrid bits, and other drilling bits and tools known in the art.

As used herein, the term "polycrystalline diamond compact" means and includes any structure comprising a polycrystalline diamond material comprising inter-granular bonds formed by a process that involves application of pressure (e.g., compaction) to a precursor material or materials used to form the polycrystalline diamond compact.

As used herein, the term "particle" means and includes any coherent volume of solid matter having an average dimension of about 500 μm or less. Grains (e.g., crystals) and coated grains are types of particles.

As used herein, the terms "inter-granular bond" and "inter-bonded" mean and include any direct atomic bond (e.g., covalent, metallic, etc.) between atoms in adjacent grains of superabrasive material (e.g., diamond).

As used herein, the term "metal solvent catalyst" means and includes transition metal elements (e.g., cobalt, iron, nickel, etc.), alloys of transition metal elements, and/or mixtures thereof.

As used herein, the term "barrier material" means and includes a material that at least substantially limits infiltration (e.g., diffusion) of a metal solvent catalyst into an adjacent material.

As used herein, the term "leached," when used in relation to a volume of polycrystalline material (e.g., a polycrystalline diamond compact), means that the volume or at least a region of the volume does not include a substantial amount of catalyst material (e.g., a metal solvent catalyst) in interstitial spaces between inter-bonded diamond grains, regardless of whether or not catalyst material was removed from that region (by a leaching process or any other removal process). Similarly, as used herein the term "leaching" means and includes removal of a catalyst material from interstitial spaces between inter-bonded diamond grains of a polycrystalline diamond compact by any technique, without limitation to acid leaching.

As used herein, any relational term, such as "first," "second," "front," "back," etc., is used for clarity and convenience in understanding the disclosure and accompanying drawings, and does not connote or depend on any specific preference or order, except where the context clearly indicates otherwise.

As used herein, the term "and/or" includes any and all combinations of one or more of the associated listed items.

FIG. 1 depicts a simplified flow diagram illustrating a method 100 of forming a cutting element, in accordance with embodiments of the disclosure. As described in further detail below, the method includes providing a diamond powder 202 at act 102, subjecting the diamond powder 202 to a first sintering process at act 104 in the absence of a metal-solvent catalyst to form a polycrystalline diamond compact (PDC), providing a barrier material 226 over at least a portion of the PDC at act 106, providing a precursor material 214 over the PDC and the barrier material 226 at act 108, and subjecting the PDC, the precursor material 214, and the barrier material 226 to a second sintering process at act 110 to form a supporting substrate in situ on the PDC to form a cutting element. Since the first sintering process 104 is performed in the absence of a metal-solvent catalyst, at least a portion of the PDC proximate an exposed exterior surface of the PDC does not include a metal-solvent catalyst. The at least a portion of the PDC proximate the exposed exterior surface of the PDC is rendered thermally stable without having to remove (e.g., leach) material from interstitial spaces of the at least portion of the PDC proximate the exposed exterior surface of the PDC. FIGS. 2A through 2D illustrate the method 100 of forming a cutting element of FIG. 1, at various acts of the method, in accordance with embodiments of the disclosure.

Figure 2A:
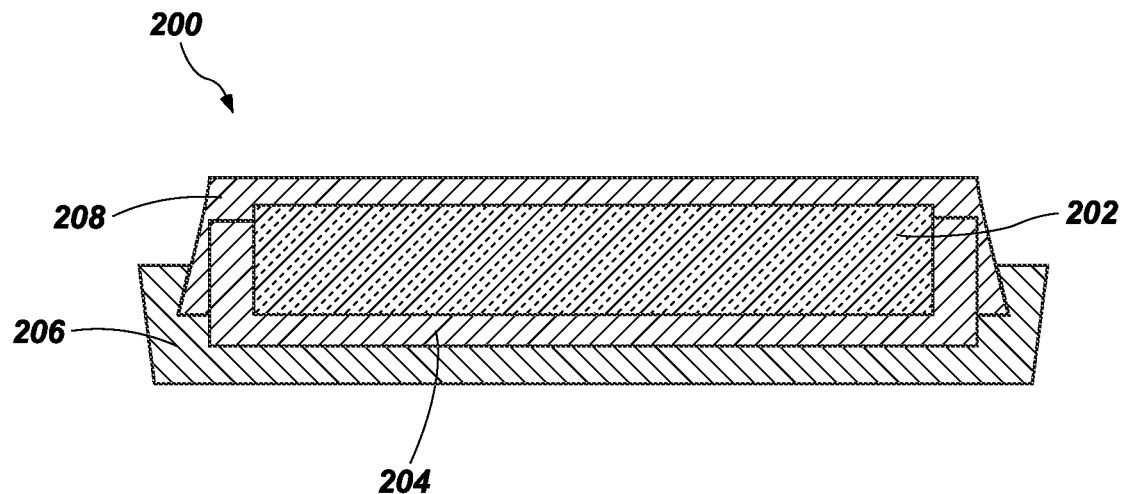
FIGS. 2A through 2D are cross-sectional views at various acts of the method of forming a cutting element of FIG. 1.

Referring to FIG. 2A, with reference to act 102 of the method 100 of FIG. 1, a diamond powder 202 may be provided within a container 200, sometimes referred to in the industry as a cartridge or a cup, that is typically comprised of a metal alloy. The container 200 may at least substantially surround and is used to hold the diamond powder 202 in position during an HPHT sintering process. As shown in FIG. 2, the container 200 may include an inner cup 204 in which at least a portion of the diamond powder 202 is disposed, a bottom end piece 206 in which the inner cup 204 may be at least partially disposed, and a top end piece 208 over the diamond powder 202 and coupled (e.g., swage bonded) to one or more of the inner cup 204 and the bottom end piece 206. In some embodiments, the bottom end piece 206 may be omitted (e.g., absent). In some embodiments, the inner cup 204 and/or the top end piece 208 may be machined to have a desired topography. For example, the inner cup 204 and/or top end piece 208 may be machined to have a substantially non-planar topography complementary to a desired topography, for example a cutting face topography, of the subsequently formed PDC.

The diamond powder 202 may be formed of and include discrete diamond particles (e.g., discrete natural diamond particles, discrete synthetic diamond particles, combinations thereof, etc.). The discrete diamond particles may individually exhibit a desired grain size. The discrete diamond particles may comprise one or more of micro-sized diamond particles and nano-sized diamond particles. For example, an individual grain size of the discrete diamond particles may be within a range of from about 5 nanometers (nm) to about 100 microns (μm), such as within a range of from about 50 nm to about 50 μm, from about 100 nm to about 30 μm, from about 500 nm to about 20 inn, or from about 700 nm to about 10 μm. In some embodiments, grain sizes of the discrete diamond particles comprise a mixture of two or more monomodal grain size distributions. In addition, each of the discrete diamond particles may individually exhibit a desired shape, such as at least one of a spherical shape, a hexahedral shape, an ellipsoidal shape, a cylindrical shape, a conical shape, or an irregular shape. In some embodiments, each of the discrete diamond particles of the diamond powder exhibits a substantially spherical shape. The discrete diamond particles may be monodisperse, wherein each of the discrete diamond particles exhibits substantially the same material composition, size, and shape, or may be polydisperse, wherein at least one of the discrete diamond particles exhibits one or more of a different material composition, a different particle size, and a different shape than at least one other of the discrete diamond particles.

In some embodiments, the diamond powder 202 includes a temporary binder binding the discrete diamond particles together to form a green body. The green body may have any desired dimensions, shape, and topography corresponding to desired dimensions, shape, and topography of a subsequently formed PDC. In some embodiments, the green body may be formed of multiple portions of the diamond powder 202 and the temporary binder. The multiple portions of the diamond powder 202 and the temporary binder may be arranged in any suitable manner to form the desired dimensions, shape, and topography of the subsequently formed PDC. The green body may be formed by any suitable method, such as, for example, an additive manufacturing process, a deposition process, a spray drying process, a vacuum drying process, a die pressing process, a tape casting process, or a combination thereof. The temporary binder may be removed during subsequent sintering processes to which the green body is exposed to during the method 100 of forming a cutting element of FIG. 1 and/or the method 300 of forming a cutting element of FIG. 3.

Figure 2B:
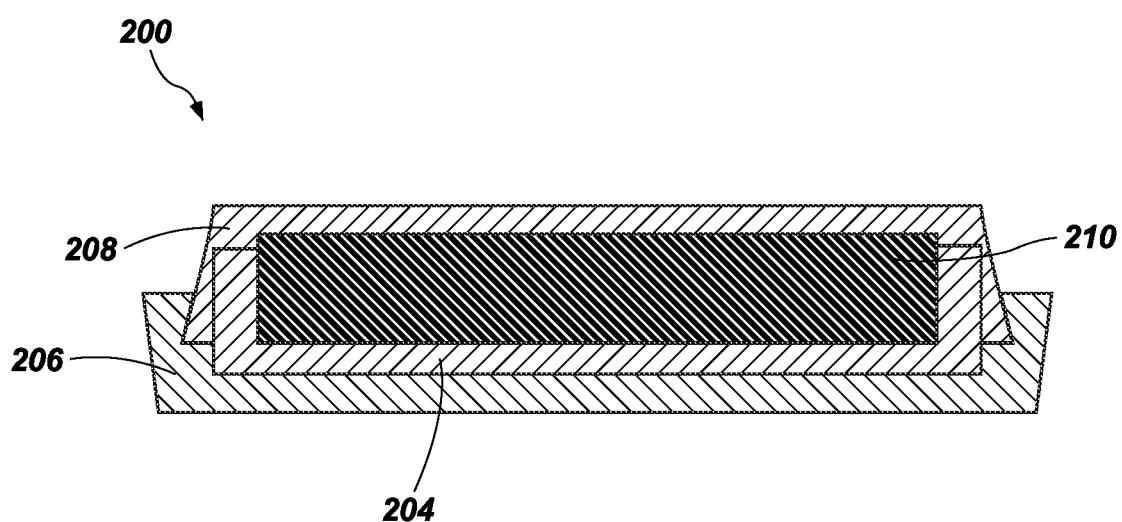

Referring next to FIG. 2B, with reference to act 104 of FIG. 1, the diamond powder 202 may be subjected to ultra-high pressure/high temperature (UHPHT) processing (e.g., a first sintering process) to form a polycrystalline diamond compact (PDC) 210 (e.g., a cutting table). The UHPHT processing is performed in the absence of a metal solvent catalyst (e.g., a metal binder). The UHPHT processing may include subjecting the diamond powder 202 to elevated temperatures and elevated pressures in a directly pressurized and/or indirectly heated cell for a sufficient time to convert the discrete diamond particles of the diamond powder 202 into inter-bonded diamond particles. Temperatures (e.g., sintering temperatures) within the pressurized, heated cell during the UHPHT processing may be greater than or equal to about 1400° C., such as, for example, greater than or equal to about 1500° C., greater than or equal to about 1700° C., or greater than or equal to about 1900° C. Pressures within the pressurized, heated cell during the UHPHT processing may be greater than or equal to about 10.0 GPa, such as, for example, greater than or equal to about 12.0 GPa, greater than or equal to about 14.0 GPa, greater than or equal to about 18.0 GPa, or greater than or equal to about 20.0 GPa. The diamond powder 202 may be held at such temperatures and pressures for a sufficient amount of time to facilitate the inter-bonding of the discrete diamond particles of the diamond powder 202, such as a period of time between about 30 seconds to about 1 hour. In some embodiments, the diamond powder 202 is held at such temperatures for a period of time between about 30 seconds to about minutes. In some embodiments, the diamond powder 202 is held at such pressures for a period of time between about 5 minutes to about 30 minutes. Since the UHPHT processing is performed in the absence of a metal solvent catalyst, the PDC 210 does not include a metal solvent catalyst.

After subjecting the diamond powder 202 to UHPHT processing, the container 200 may be removed by, for example, one or more machining processes to expose the PDC 210. The PDC 210 may be formed in container 200 to exhibit any desired dimensions and any desired shape. The desired dimensions and shape of the PDC 210 may at least partially depend upon desired dimensions and desired shapes of a subsequently formed cutting element including the PDC 210. In some embodiments, the PDC 210 is formed to exhibit a cylindrical column shape. The PDC 210 may be formed to exhibit any desired lateral cross-sectional shape including, but not limited to, a circular shape, an elliptical shape, an ovular shape, a polygonal shape, or an irregular shape.

Figure 2C:
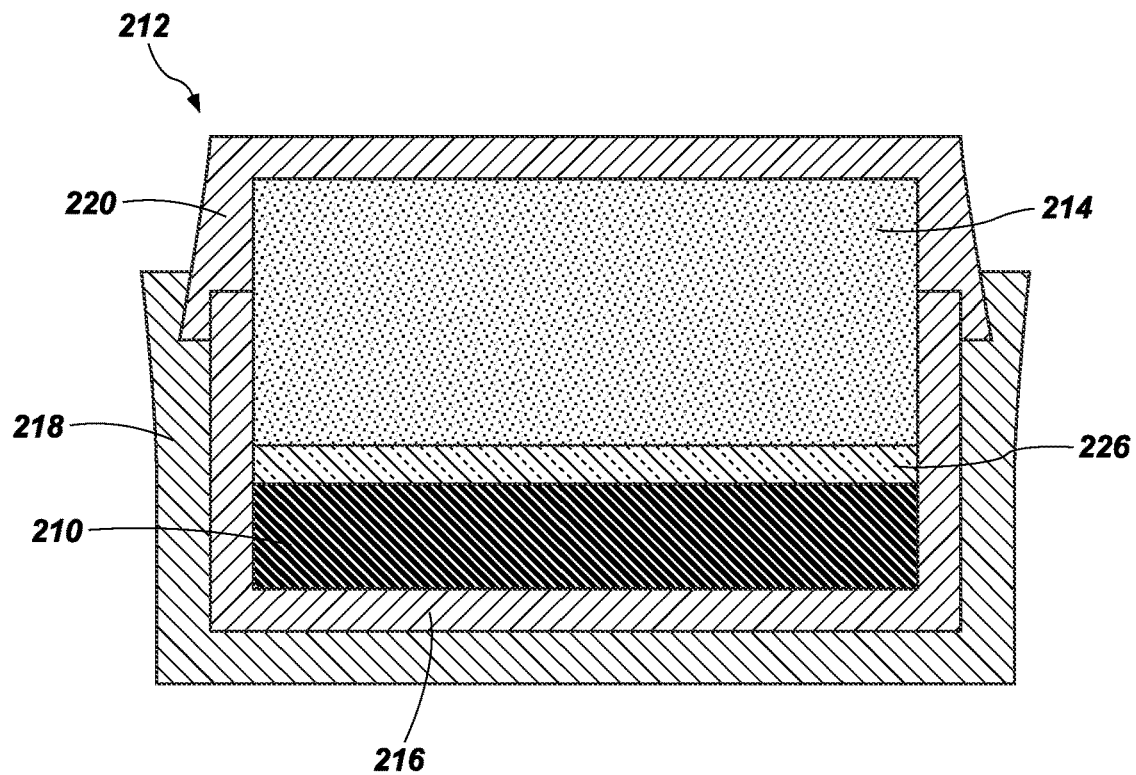

Referring to FIG. 2C, the PDC 210 may be provided in a container 212. The container 212 and components thereof may be at least substantially similar to the container 200 and components thereof previously described with reference to FIG. 2. With reference to act 106 of FIG. 1, a barrier material 226 may be provided over at least a portion of the PDC 210 within the container 212. With reference to act 108 of FIG. 1, a precursor material 214 may be provided in the container 212 on the PDC 210. The container 212 may at least substantially surround and hold the PDC 210, the barrier material 226, and the precursor material 214. As shown in FIG. 2C, the container 212 may include an inner cup 216 in which the PDC 210, the barrier material 226, and at least a portion of the precursor material 214 may be disposed, a bottom end piece 218 in which the inner cup 216 may be at least partially disposed, and a top end piece 220 surrounding at least a portion of the precursor material 214 and coupled (e.g., swage bonded) to one or more of the inner cup 216 and the bottom end piece 218. In some embodiments, the bottom end piece 218 is omitted (e.g., absent).

The barrier material 226 may include a powder or a coating provided between the PDC 210 and the precursor material 214. In some embodiments, the barrier material 226 is deposited on the PDC 210 and/or the precursor material 214 adjacent an interface region between the PDC 210 and the precursor material 214. The barrier material 226 may extend over at least a portion of a surface of the PDC 210 between PDC 210 and the precursor material 214. In some embodiments, the barrier material 226 at least substantially extends along an entirety of an interface region between the PDC 210 and the precursor material 214. In some embodiments, the barrier material 226 may be a coating provided on the precursor material 214. In some embodiments, the barrier material 226 is deposited on the PDC 210 and/or the precursor material 214 adjacent the interface region between the PDC 210 and the precursor material 214 by a coating process, such as, as non-limiting examples, a thermal spray coating process, a chemical vapor deposition (CVD) process, or an electrochemical deposition process. The barrier material 226 may extend at least partially into the PDC 210 and/or the precursor material 214, thereby forming at least one transition region adjacent to the barrier material 226. The at least one transition region may include an amount of the barrier material 226 within a range of from about 5% by volume (vol %) to about 95 vol %. The barrier material 226 may at least substantially limit infiltration (e.g., diffusion) of the metal binder of the precursor material 214 into the PDC 210. In some embodiments, the barrier material 226 at least substantially prevents infiltration of the metal binder of the precursor material 214 into the PDC 210. The barrier material 226 may include one or more of tantalum, rhenium, tungsten, iridium, hafnium, niobium, molybdenum, titanium, zirconium, platinum, copper, lead, silver, and gold. In some embodiments, the barrier material 226 includes a non-catalytic material. The barrier material 226 may have a melting temperature greater than processing temperatures (e.g., sintering temperatures) to which the barrier material 226 is exposed to during the method 100 of forming a cutting element of FIG. 1 and/or the method 300 of forming a cutting element of FIG. 3.

The precursor material 214 may include a carbide material and a metal binder (e.g., a metal-solvent catalyst). The precursor material 214 may include the metal binder within a range of from about 5% by weight (wt %) to about 20 wt %. In some embodiments, the metal binder is omitted (e.g., absent) from the precursor material 214. The carbide material may include, for example, one or more of tungsten carbide, titanium carbide, vanadium carbide, silicon carbide, and tantalum carbide. In some embodiments, the carbide material is tungsten carbide. In some embodiments, the metal binder includes one or more transition metal elements (e.g., iron, cobalt, nickel, manganese, etc.) and/or one or more alloys of transition metal elements. The precursor material 214 may include one or more of discrete carbide particles and/or sintered carbide particles comprising carbide particles bonded together by the metal binder (e.g., a cermet material). The precursor material 214 may further include one or more additional additives. In some embodiments, the precursor material 214 includes a temporary binder binding the carbide material and the metal binder together to form a green body. The green body may have any desired dimensions, shape, and topography corresponding to desired dimensions, shape, and topography of a subsequently formed supporting substrate. The temporary binder may be removed during subsequent sintering processes to which the green body is exposed to during the method 100 of forming a cutting element of FIG. 1 and/or the method 300 of forming a cutting element of FIG. 3.

Figure 2D:
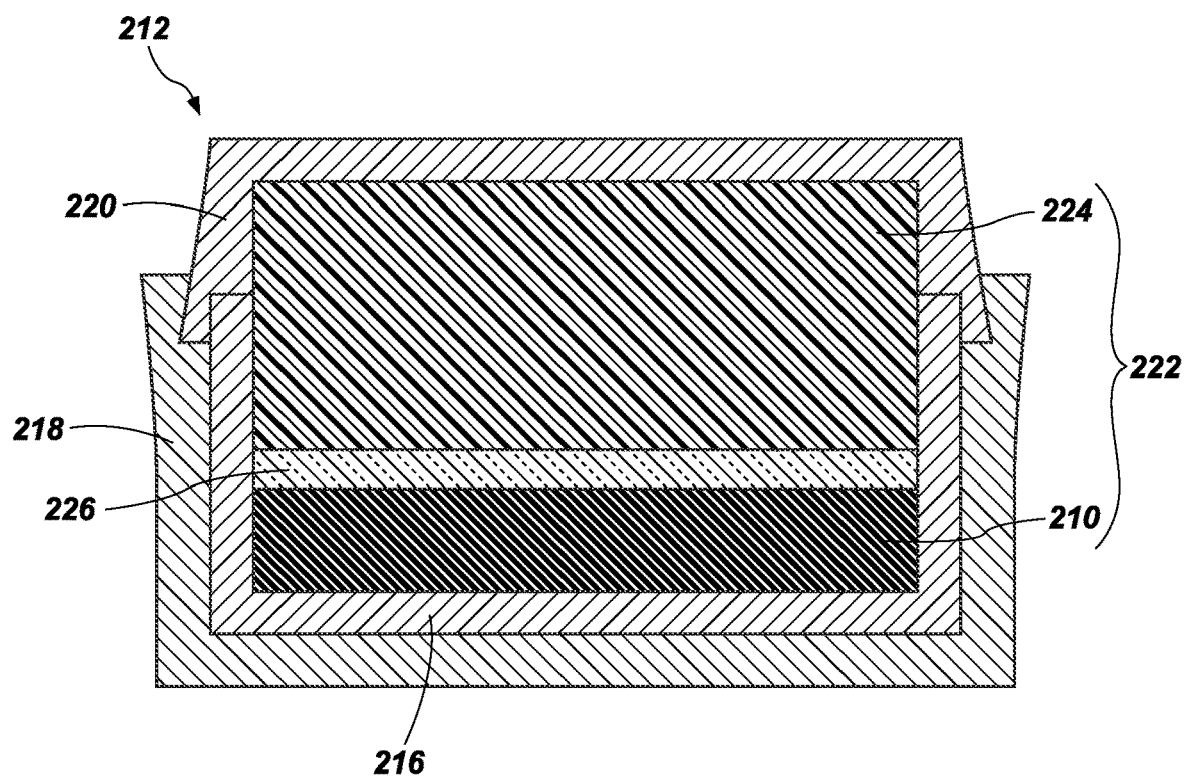

Referring next to FIG. 2D, with reference to act 110 of FIG. 1, the PDC 210 and the precursor material 214 may be subjected to high pressure/high temperature (HPHT) processing (e.g., a second sintering process) to form a supporting substrate 224 in situ on the PDC 210. The supporting substrate 224 with the PDC 210 bonded thereto form a cutting element 222. The cutting element 222 may include the barrier material 226 between the PDC 210 and the supporting substrate 224. The HPHT processing may include subjecting the PDC 210, the precursor material 214, and the barrier material 226, to elevated temperatures and elevated pressures in a directly pressurized and/or indirectly heated cell for a sufficient time to convert (e.g., consolidate) the precursor material 214 into the supporting substrate 224. Temperatures (e.g., sintering temperatures) within the pressurized, heated cell during the HPHT processing may be greater than or equal to 1400° C., such as, for example, greater than or equal to about 1500° C., greater than or equal to about 1600° C., or greater than or equal to about 1700° C. Temperatures within the pressurized, heated cell during the HPHT processing of the PDC 210, the barrier material 226, and the precursor material 214 may be less than temperatures within the pressurized, heated cell during the UHPHT processing of the diamond powder 202. Pressures within the pressurized, heated cell during the HPHT processing may be greater than or equal to about 5.0 GPa, such as, for example, greater than or equal to about 6.0 GPa, greater than or equal to about 7.0 GPa, or greater than or equal to about 8.0 GPa. In some embodiments, pressures within the pressurized, heated cell during the HPHT processing are within a range of from about 5.0 GPa to about 9.0 GPa. Pressures within the pressurized, heated cell during the HPHT processing of the PDC 210, the barrier material 226, and the precursor material 214 may be less than pressures within the pressurized, heated cell during the UHPHT processing of the diamond powder 202. The PDC 210, the barrier material 226, and the precursor material 214 may be held at such temperatures and pressures for a sufficient amount of time to facilitate consolidation of the precursor material 214 to form the supporting substrate 224, such as a period of time between about 30 seconds to about 30 minutes. In some embodiments, the PDC 210, the barrier material 226, and the precursor material 214 are held at such temperatures for a period of time between about 30 seconds to about 15 minutes. In some embodiments, the PDC 210, the barrier material 226, and the precursor material 214 are held at such pressures for a period of time between about 5 minutes to about 30 minutes.

In some embodiments, during the HPHT processing, at least a portion of the metal binder of the supporting substrate 224 is swept (e.g., mass transported, diffused) into interstitial spaces in only a portion of the PDC 210 adjacent the supporting substrate 224. However, since the PDC 210 is formed in the absence of a metal solvent catalyst, at a least portion of the PDC 210 proximate the exposed exterior surface of the PDC 210 does not include the metal binder and is rendered thermally stable without having to remove (e.g., leach) material from interstitial spaces of the portion of the PDC 210 proximate the exposed exterior surface of the PDC 210. After subjecting the PDC 210, the barrier material 226, and the precursor material 214 to HPHT processing, the container 212 may be removed by, for example, one or more machining processes to expose the cutting element 222.

Figure 3:
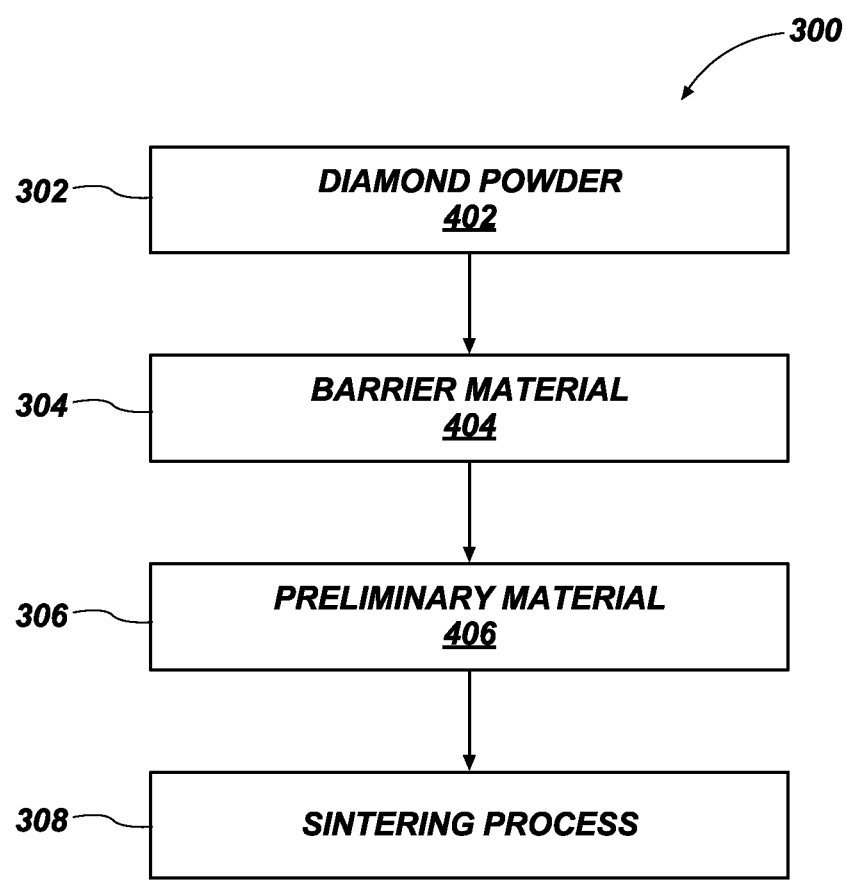
FIG. 3 is a simplified flow diagram depicting a method of forming a cutting element, according to additional embodiments of the disclosure.
Figure 4A:
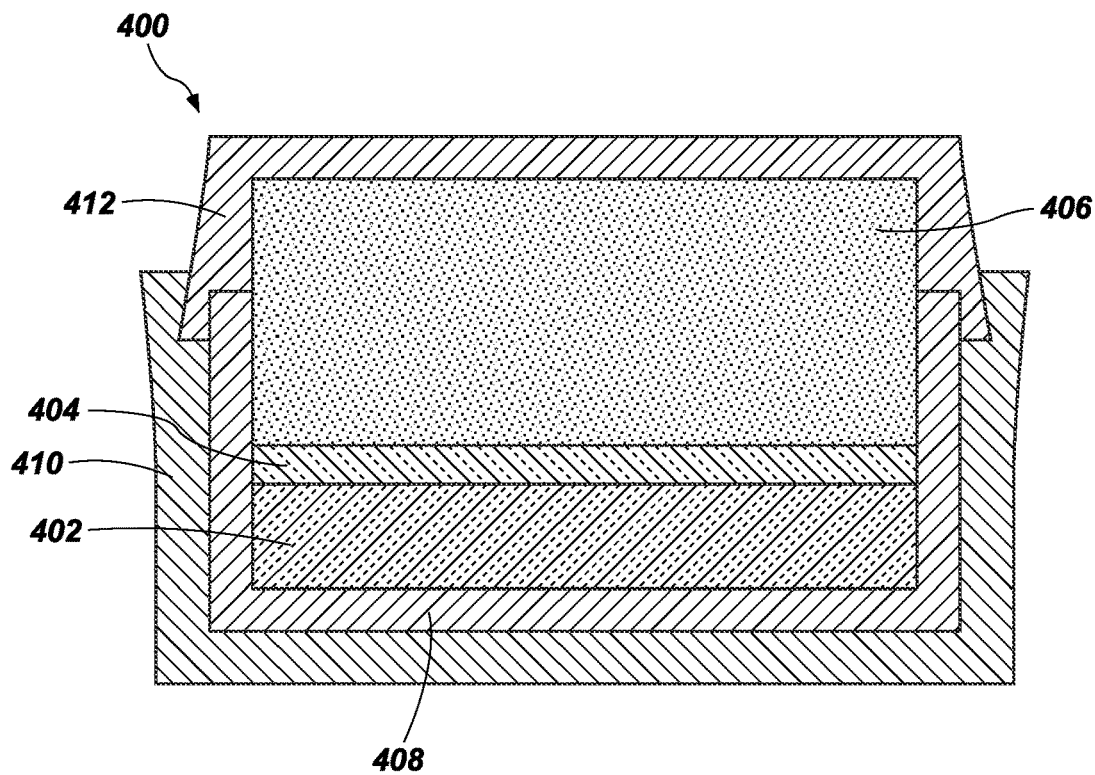
FIGS. 4A and 4B are cross-sectional views at various acts of the method of forming a cutting element of FIG. 3.
Figure 4B:
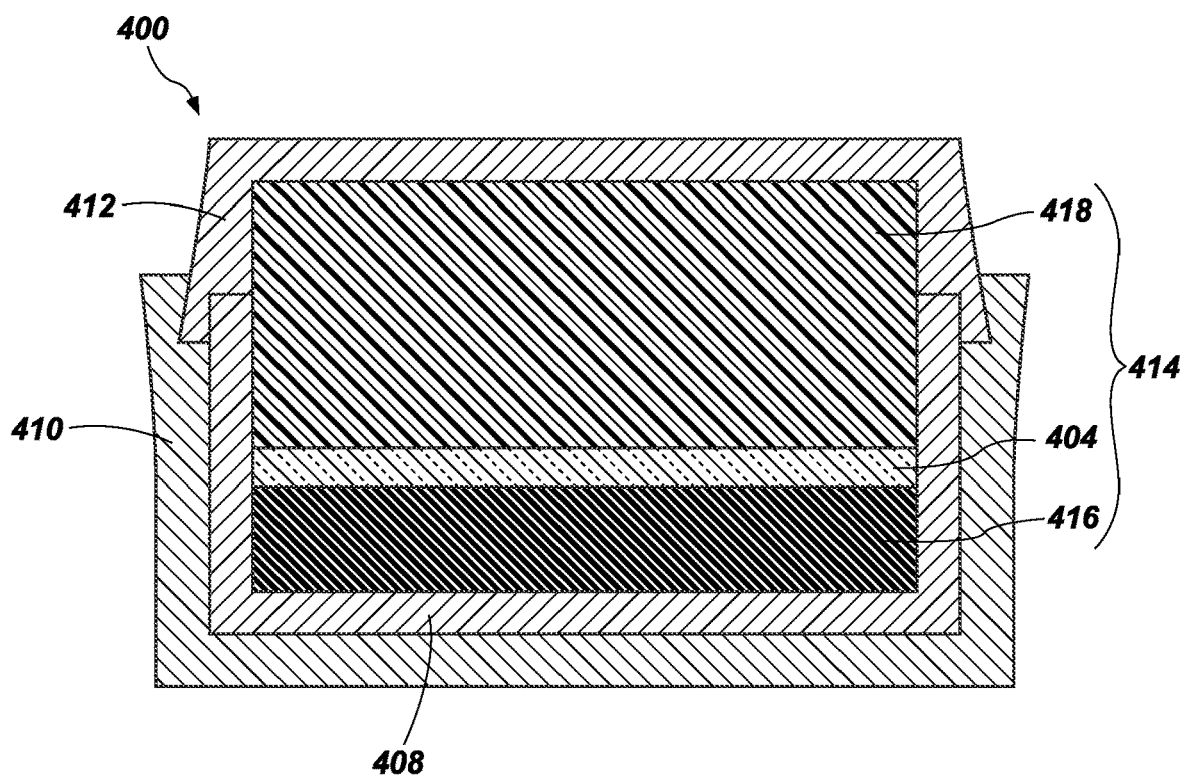

FIG. 3 depicts a simplified flow diagram illustrating a method 300 of forming a cutting element, in accordance with embodiments of the disclosure. As described in further detail below, the method includes providing a diamond powder 402 at act 302, providing a barrier material 404 over at least a portion of the diamond powder 402 at act 304, providing a precursor material 406 over the barrier material 404 at act 306, and subjecting the diamond powder 402, the barrier material 404, and the precursor material 406 to a sintering process at act 308, thereby forming a supporting substrate in situ on a PDC, the barrier material 404 between the PDC and supporting substrate. The supporting substrate, the barrier material 404, and the PDC bonded together form a cutting element. FIGS. 4A and 4B illustrate different processing acts of the method 300 of forming a cutting element of FIG. 3, in accordance with embodiments of the disclosure.

Referring to FIG. 4A, with reference to acts 302 through 306 of the method 300 of FIG. 3, the diamond powder 402, the barrier material 404, and the precursor material 406 may be provided within a container 400. The diamond powder 402, the barrier material 404, the precursor material 406, and the container 400 and components thereof may be at least substantially similar to the diamond powder 202, the barrier powder 226, the precursor material 214, and the container 200 and components thereof previously described with reference to FIGS. 2A through 2D. The barrier material 404 may be provided over at least a portion of the diamond powder 402. The precursor material 406 may be provided over the barrier material 404. In some embodiments, the barrier material 404 at least substantially extends along an entirety of an interface region between the diamond powder 402 and the precursor material 406.

The barrier material 404 may include a powder or a coating provided between the diamond powder 402 and the precursor material 406. In some embodiments, the barrier material 404 may be a coating provided on the precursor material 406. In some embodiments, the barrier material 404 is deposited on the diamond powder 402 and/or the precursor material 406 adjacent the interface region between the diamond powder 402 and the precursor material 406 by a coating process, such as, as non-limiting examples, a thermal spray coating process, a chemical vapor deposition (CVD) process, or an electrochemical deposition process. The barrier material 404 may extend at least partially into the diamond powder 402 and/or the precursor material 406, thereby forming at least one transition region adjacent to the barrier material 404. The at least one transition region may include an amount of the barrier material 404 within a range of from about 5% by mass (mass %) to about 95 mass %. The barrier material 404 may at least substantially limit infiltration (e.g., diffusion) of the metal binder of the precursor material 406 into the diamond powder 402 and/or subsequently formed PDC. In some embodiments, the barrier material 404 at least substantially prevents infiltration of the metal binder of the precursor material 406 into the diamond powder 402 and/or subsequently formed PDC.

The container 400 may at least substantially surround and hold the diamond powder 402, the barrier material 404, and the precursor material 406. As shown in FIG. 4A, the container 400 may include an inner cup 408 in which the diamond powder 402, the barrier material 404, and at least a portion of the precursor material 406 may be disposed, a bottom end piece 410 in which the inner cup 408 may be at least partially disposed, and a top end piece 412 surrounding at least a portion of the precursor material 406 and coupled (e.g., swage bonded) to one or more of the inner cup 408 and the bottom end piece 410. In some embodiments, the bottom end piece 410 is omitted (e.g., absent).

Referring next to FIG. 4B, with reference to act 308 of the method 300 of FIG. 3, the diamond powder 402, the barrier material 404, and the precursor material 406 may be subjected to UHPHT processing (e.g., a sintering process) to form a supporting substrate 418 in situ on a PDC 416 (e.g., a cutting table). The supporting substrate 418 with the PDC 416 bonded thereto form a cutting element 414. The barrier material 404 may be disposed between the PDC 416 and the supporting substrate 418. The UHPHT processing may include subjecting the diamond powder 402, the barrier material 404, and the precursor material 406 to elevated temperatures and elevated pressures in a directly pressurized and/or indirectly heated cell for a sufficient time to convert the discrete diamond particles of the diamond powder 402 into inter-bonded diamond particles. Temperatures (e.g., sintering temperatures) within the pressurized, heated cell during the UHPHT processing may be greater than or equal to about 1400° C., such as, for example, greater than or equal to about 1500° C., greater than or equal to about 1700° C., or greater than or equal to about 1900° C. Pressures within the pressurized, heated cell during the UHPHT processing may be greater than or equal to about 10.0 GPa, such as, for example, greater than or equal to about 12.0 GPa, greater than or equal to about 14.0 GPa, greater than or equal to about 18.0 GPa, or greater than or equal to about 20.0 GPa. The diamond powder 202 may be held at such temperatures and pressures for a sufficient amount of time to facilitate the inter-bonding of the discrete diamond particles of the diamond powder 202, such as a period of time between about such as a period of time between about 30 seconds to about 1 hour. In some embodiments, the diamond powder 402, the supporting substrate 418, and the barrier material 404 are held at such temperatures for a period of time between about 30 seconds to about 15 minutes. In some embodiments, the diamond powder 402, the supporting substrate 418, and the barrier material 404 are held at such pressures for a period of time between about 5 minutes to about 1 hour.

The barrier material 404 may at least substantially limit infiltration (e.g., diffusion) of the metal binder of the precursor material 406 into the diamond powder 402 and/or the PDC 416 during the UHPHT processing. In some embodiments, at least a portion of the metal binder of the precursor material 406 and supporting substrate 418 is swept (e.g., diffused, transported) into only a portion of the PDC 416 adjacent the supporting substrate 418. At least a portion of the PDC 416 proximate an exposed exterior surface of the PDC 416 is at least substantially free of the metal binder, thereby rendering the at least portion of the PDC 416 proximate the exposed exterior surface of the PDC thermally stable without having to remove (e.g., leach) material from the at least a portion of the PDC 416 proximate an exposed exterior surface of the PDC 416. When the metal binder is present in the at least a portion of the PDC 416 adjacent the supporting substrate 418, the at least a portion of the PDC 416 adjacent the supporting substrate 418 is less vulnerable to shear, compressive, and tensile stresses.

After subjecting the diamond powder 402, the barrier material 404, and the precursor material to UHPHT processing, the container 400 may be removed by, for example, one or more machining processes to expose the cutting element 414. The PDC 416 and the supporting substrate 418 may be formed to exhibit any desired dimensions and any desired shape. The desired dimensions and shape of the PDC 416 and the supporting substrate 418 may at least partially depend upon desired dimensions and desired shapes of the cutting element 414. In some embodiments, the PDC 416 and the supporting substrate 418 are formed to each exhibit a cylindrical column shape.

Figure 5:
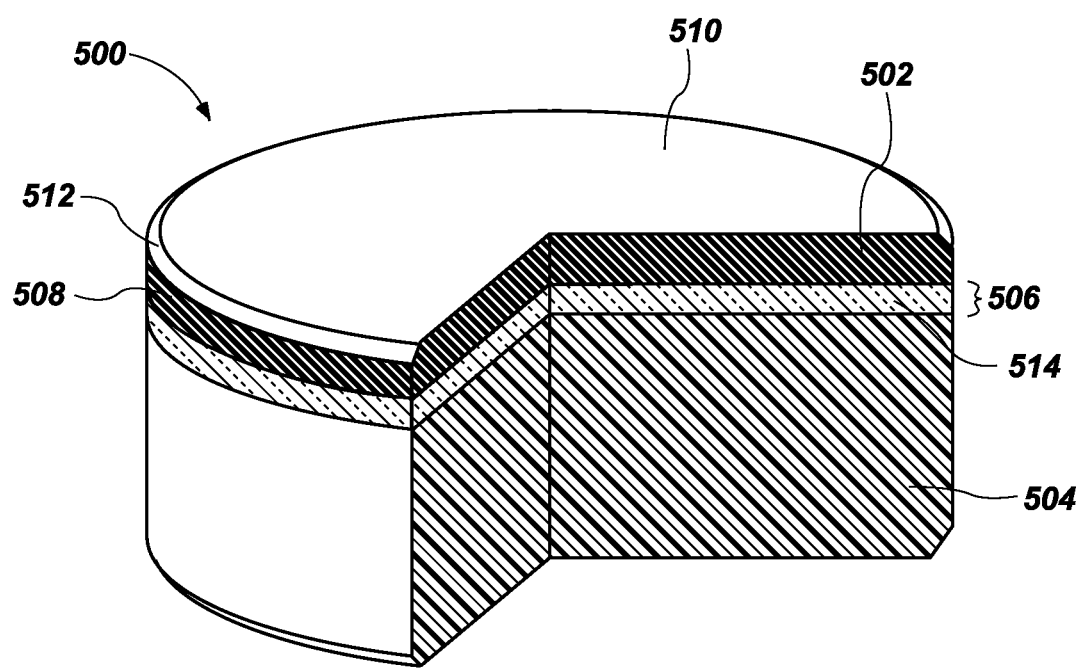
FIG. 5 is a partial cut-away perspective view of a cutting element, in accordance with embodiments of the disclosure.

FIG. 5 depicts partial cut-away perspective view of a cutting element 500, in accordance with embodiments of the disclosure. The cutting element 500 may be formed in accordance with at least one of the methods previously described with reference to FIGS. 1 through 4B. In some embodiments, the cutting table 502 is formed during a UHPHT process (e.g., a first sintering process) in the absence of a metal-solvent catalyst and, thereafter, the supporting substrate 504 is formed in situ on the cutting table 502 during a subsequent HPHT process (e.g., a second sintering process). The barrier material 514 may be provided over the cutting table 502 (e.g., PDC) between the UHPHT process and the subsequent HPHT process. In other embodiments, supporting substrate 504 is formed on the cutting table 502 by subjecting a diamond powder (e.g., discrete diamond particles) and a precursor material to a single UHPHT process (e.g., a sintering process), the barrier material 514 provided between the diamond powder and the precursor material. The supporting substrate 504 with the cutting table 502 bonded thereto and the barrier material 514 between the supporting substrate 504 and the cutting table 502 form the cutting element 500.

The cutting element 500 is depicted in FIG. 5 as exhibiting a cylindrical column shape. However, in some embodiments, the cutting element 500 may exhibit a different shape, such as, for example, a dome shape, a conical shape, a frusto-conical shape, a rectangular column shape, a pyramidal shape, a frusto-pyramidal shape, a fin shape, a pillar shape, a stud shape, or an irregular shape. The interface region 506 is depicted in FIG. 5 as being at least substantially planar. However, in some embodiments, the interface region 506 is at least substantially non-planar (e.g., convex, concave, ridged, sinusoidal, angled, jagged, V-shaped, U-shaped, irregularly shaped, etc.). For example, the supporting substrate 504 may include one or more protrusions and/or one or more recesses at the interface region 506 and the cutting table 502 may include one or more corresponding complementary recesses and/or corresponding complementary protrusions at the interface region 506. In some embodiments, the supporting substrate 504 includes sidewalls extending from the supporting substrate 504 towards an exposed cutting surface (e.g., a cutting face, a cutting edge) of the cutting table 502. The sidewalls of the supporting substrate 504 may at least substantially surround at least a portion of the cutting table 502. In other embodiments, the cutting table 502 includes sidewalls extending from the cutting table 502 towards an exposed major surface of the supporting substrate 504. The sidewalls of the cutting table 502 may at least substantially surround at least a portion of the supporting substrate 504. In some embodiments, a thickness of the cutting table 502 and/or a thickness of the supporting substrate 504 vary along the interface region 506.

A thickness (e.g., height) extending from an exposed major surface of the supporting substrate 504 to the cutting face 510 of the cutting element 500 may be within a range of from about 5 millimeters (mm) to about 25 mm, such as, for example, from about 7 mm to about mm or from about 10 mm to about 15 mm. When the cutting element 500 exhibits a cylindrical shape, a ratio of a thickness of the cutting element 500 to an outer diameter of the cutting element 500 may be within a range of from about 0.01 to about 5, such as, for example, from about 0.1 to 2. A thickness extending from the interface region 506 to the cutting face 510 of the cutting table 502 may be within a range of from about 0.3 mm to about 10 mm, such as, for example, from about 1 mm to about 5 mm or from about 1.5 mm to about 4 mm. A thickness extending from the interface region 506 to the exposed major surface of the supporting substrate 504 may be within a range of from about 0.7 mm to about 15 mm, such as, for example, from about 1 mm to about 10 mm, or from about 3 mm to about 7 mm. A thickness extending from the interface region 506 to the exposed major surface of the supporting substrate 504 along an exposed outer edge of the supporting substrate may be greater than or equal to about 3 mm, such as, for example, greater than or equal to about 4 mm or greater than or equal to about 5 mm. A ratio of a thickness of the cutting table 502 to a thickness of the supporting substrate 504 may be within a range of from about 0.05 to about 5, such as, for example, from about 0.1 to 2. A ratio of a thickness of the cutting table 502 to a corresponding thickness of the supporting substrate 504 may vary within a range of from about 0.05 to about 5 along the interface region 506 between the cutting table 502 and the supporting substrate 504.

The supporting substrate 504 may be a consolidated structure including the precursor materials 214 and 406 previously described with reference to FIGS. 2C through 4B. In some embodiments, the supporting substrate 504 is formed in situ on the cutting table 502 during an HPHT process. For example, the supporting substrate 504 may be a consolidated structure including a carbide material dispersed within a metal binder. In some embodiments, the supporting substrate 504 does not include a metal binder. The supporting substrate 504 is depicted in FIG. 5 as exhibiting a cylindrical column shape. However, the supporting substrate 504 may exhibit any suitable shape with respect to the shape of the cutting element 500.

The cutting table 502 is depicted in FIG. 5 as exhibiting a cylindrical column shape. However, the cutting table 502 may exhibit any suitable shape with respect to the shape of the cutting element 500. The cutting table may exhibit at least one lateral side surface 508, a cutting face 510 opposite the interface region 506, and at least one cutting edge 512 at a periphery of the cutting face 510. Surfaces (e.g., the at least one lateral side surface 508, the cutting face 510) of the cutting table 502 adjacent the cutting edge 512 may each be substantially planar, or one or more of the surfaces of the cutting table 502 adjacent the cutting edge 512 may be at least partially non-planar. Each of the surfaces of the cutting table 502 may be polished, or one or more of the surfaces of the cutting table 502 may be at least partially non-polished.

The cutting edge 512 of the cutting table 502 may be at least partially (e.g., substantially) chamfered (e.g., beveled), at least partially (e.g., substantially) radiused (e.g., arcuate), at least partially chamfered and partially radiused, or may be non-chamfered and non-radiused. In some embodiments, the cutting edge 512 is chamfered, as shown in FIG. 5. The cutting edge 512 may including a single chamfer or may include multiple (e.g., more than one) chamfers.

The cutting table 502 is a PDC formed of inter-bonded diamond particles. In some embodiments, the cutting table 502 is formed by subjecting a diamond powder to a UHPHT process in the absence of a metal-solvent catalyst, thereby converting discrete diamond particles of the diamond powder into the inter-bonded diamond particles. At least a portion (e.g., volume) of the cutting table 502 proximate an exposed exterior surface (e.g., the at least one lateral side surface 508, the cutting face 510, the cutting edge 512) of the cutting table 502 is at least substantially free of the metal binder of the supporting substrate 504. In some embodiments, a portion of the cutting table 502 adjacent the supporting substrate 504 includes at least a portion of the metal binder. In other embodiments, the entirety of the cutting table 502 is at least substantially free of the metal binder. The at least a portion of the cutting table 502 proximate an exposed exterior surface of the cutting table 502 is rendered thermally stable without having to remove (e.g., leach) material from the at least a portion of the cutting table 502 proximate an exposed exterior surface of the cutting table 502. When the metal binder is present in the at least a portion of the cutting table 502 adjacent the supporting substrate 504, the cutting table 502 is less brittle and less vulnerable to shear, compressive, and tensile stresses as compared to conventional fully-leached cutting tables.

The barrier material 514 is at least substantially similar to the barrier materials (e.g., the barrier materials 226, 404) previously described in detail with reference to FIGS. 1 through 4B. Material types, characteristics, configuration, etc. of the barrier material 514 are as described above for FIGS. 1 through 4B. The barrier material 514 extends along at least a portion of the interface region 506 between the supporting substrate 504 and the cutting table 502. In some embodiments, the barrier material 514 extends along the entirety of the interface region 506 between the supporting substrate 504 and the cutting table 502, as depicted in FIG. 5. The barrier material 514 may be at least substantially planar or at least substantially non-planar. In some embodiments, the barrier material 514 conforms to the topography of the interface region 506.

Figure 6A:
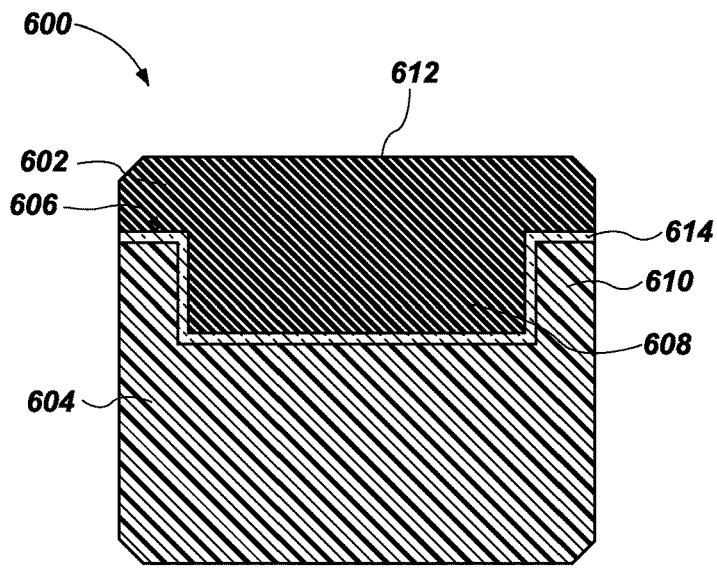
FIGS. 6A through 6C are simplified cross-sectional views of cutting elements, according to embodiments of the disclosure.
Figure 6B:
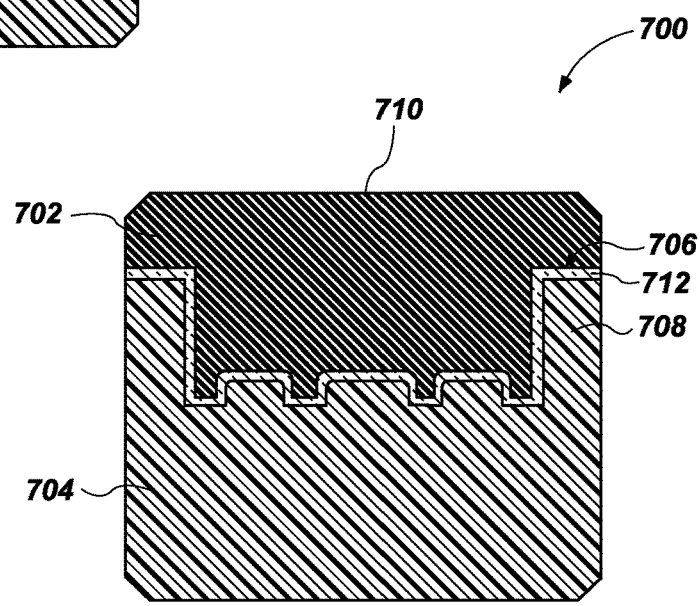
Figure 6C:
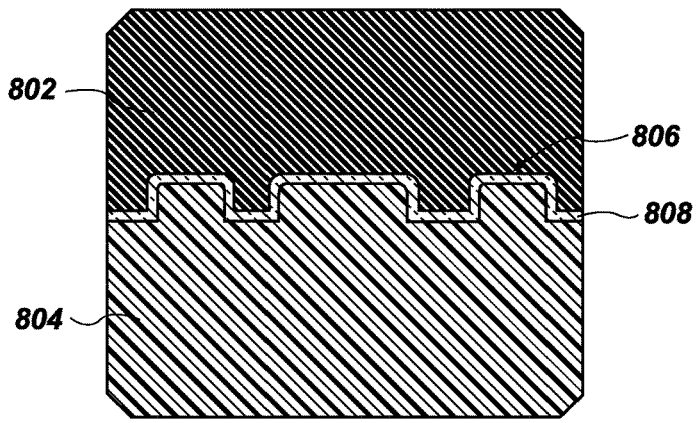

FIGS. 6A through 6C depict simplified cross-sectional views of cutting elements 600, 700, and 800, respectively, formed in accordance with embodiments of the disclosure. The cutting elements 600, 700, and 800 are at least substantially similar to the cutting element 500 described with reference to FIG. 5 and each include a cutting table 602, 702, and 802 on a supporting substrate 604, 704, and 804, respectively. Unless otherwise specified, the material compositions and characteristics of the cutting elements 600, 700, and 800 and the components thereof are as described above for FIG. 5. The cutting elements 600, 700, and 800 each include a non-planar interface region 606, 706, and 806, respectively, as shown in FIGS. 7A through 7C. The cutting elements 600, 700, and 800 each include a barrier material 614, 712, and 808 between the cutting table 602, 702, and 802 and the supporting substrate 604, 704, and 804, respectively. The barrier materials 614, 712, and 808 are at least substantially similar to the barrier materials (e.g., the barrier materials 226, 404, 516) previously described with reference to FIGS. 1 through 5. Material types, characteristics, configuration, etc., of the barrier material are as described above for FIGS. 1 through 5.

In some embodiments, the cutting tables 602, 702, and 802 are formed during a UHPHT process (e.g., a first sintering process) in the absence of a metal-solvent catalyst and, thereafter, the supporting substrates 604, 704, and 804 are formed in situ on the cutting tables 602, 702, and 802 during a subsequent HPHT process (e.g., a second sintering process). The barrier materials 614, 712, and 808 may be provided over the cutting tables 602, 702, and 802 (e.g., PDC), respectively, between the UHPHT process and the subsequent HPHT process. In other embodiments, the cutting tables 602, 702, and 802 and the supporting substrates 604, 704, and 804 are formed during a single UHPHT process (e.g., a sintering process) and include barrier materials 614, 712, and 808 between the cutting tables 602, 702, and 802 and the supporting substrates 604, 704, and 804, respectively. The supporting substrates 604, 704, and 804 with the cutting tables 602, 702, and 802 bonded thereto and the barrier material 614, 712, and 808 between the supporting substrates 604, 704, and 804 and the cutting tables 602, 702, and 802 form the cutting elements 600, 700, and 800, respectively.

In some embodiments, the cutting tables 602, 702, and 802 are formed in a container at least substantially similar to the container 200 described with reference to FIG. 2A. The container may be comprised of a metal or a metal alloy. The container may include an inner cup, a bottom end piece, and a top end piece, as described above with reference to FIG. 2A. The inner cup and/or the top end piece may be, for example, machined to have a topography complementary to a desired topography of the interface regions 606, 706, and 806 and/or a desired topography of the cutting tables 602, 702, and 802. Accordingly, the cutting tables 602, 702, and 802 may be formed during a UHPHT process to exhibit the desired topography. The supporting substrates 604, 704, and 804, formed in situ on the cutting table 602, 702, and 802, respectively, may be formed to exhibit a complementary topography during the subsequent HPHT process, thereby forming the non-planar interface regions 606, 706, and 806.

In some embodiments, the cutting tables 602, 702, and 802 and/or the supporting substrates 604, 704, and 804 are formed from green bodies exhibiting the desired topographies of the cutting tables 602, 702, and 802 and/or the desired complementary topographies of the supporting substrates 604, 704, and 804. Accordingly, the cutting tables 602, 702, and 802 and the supporting substrates 604, 704, and 804 may be formed during a UHPHT process and/or a HPHT process to exhibit the desired topographies and/or the desired complementary topographies, thereby forming the non-planar interface regions 606, 706, and 806. The barrier materials 614, 712, and 808 may be conformally formed and may exhibit a topography corresponding to a topography of the non-planar interface regions 606, 706, and 806, respectively.

With reference to FIG. 6A, the cutting element 600 includes the cutting table 602 attached to the supporting substrate 604. The cutting table 602 includes a protrusion 608 at least substantially surrounded by sidewalls 610 of the supporting substrate 604. The sidewalls 610 may extend from the supporting substrate 604 towards a cutting face 612 of the cutting table 602, as shown in FIG. 6A. A thickness of the cutting table 602 and a thickness of the supporting substrate 604 vary along the non-planar interface region 606, as shown in FIG. 6A. In some embodiments, the cutting table 602 includes at least one (e.g., one or more than one) protrusions and/or at least one recess and the supporting substrate includes at least one complementary corresponding recess and/or at least one complementary corresponding protrusion. The barrier material 614 may exhibit a topography corresponding to the topography of the cutting table 602 and/or the supporting substrate 604.

Referring next to FIG. 6B, the cutting element 700 includes the cutting table 702 attached to the supporting substrate 704. The supporting substrate 704 includes sidewalls 708 at least substantially surrounding at least a portion of the cutting table 702. The sidewalls 708 may extend from the supporting substrate 704 towards a cutting face 710 of the cutting table 702, as shown in FIG. 7B. A thickness of the cutting table 702 and a thickness of the supporting substrate 704 vary along the non-planar interface region 706, as shown in FIG. 7B. The cutting table 702 may include at least one protrusion and/or at least one recess and the supporting substrate 704 may include at least one corresponding complementary recess and/or at least one corresponding complementary protrusion. The at least one protrusion and/or at least one recess of the cutting table 702 may be configured to interlock with the at least one corresponding complementary recess and/or at least one corresponding complementary protrusion of the supporting substrate 704. The barrier material 712 may exhibit a topography corresponding to the topography of the cutting table 702 and/or the supporting substrate 704.

With reference to FIG. 6C, the cutting element 800 includes the cutting table 802 attached to the supporting substrate 804. A thickness of the cutting table 802 and a thickness of the supporting substrate 804 vary along the interface region 806, as shown in FIG. 7C. The cutting table 802 may include at least one protrusion and/or at least one recess and the supporting substrate 804 may include at least one corresponding complementary recess and/or at least one corresponding complementary protrusion. The at least one protrusion and/or at least one recess of the cutting table 802 may be configured to interlock with the at least one corresponding complementary recess and/or at least one corresponding complementary protrusion of the supporting substrate 804. The barrier material 808 may exhibit a topography corresponding to the topography of the cutting table 802 and/or the supporting substrate 804.

Figure 7:
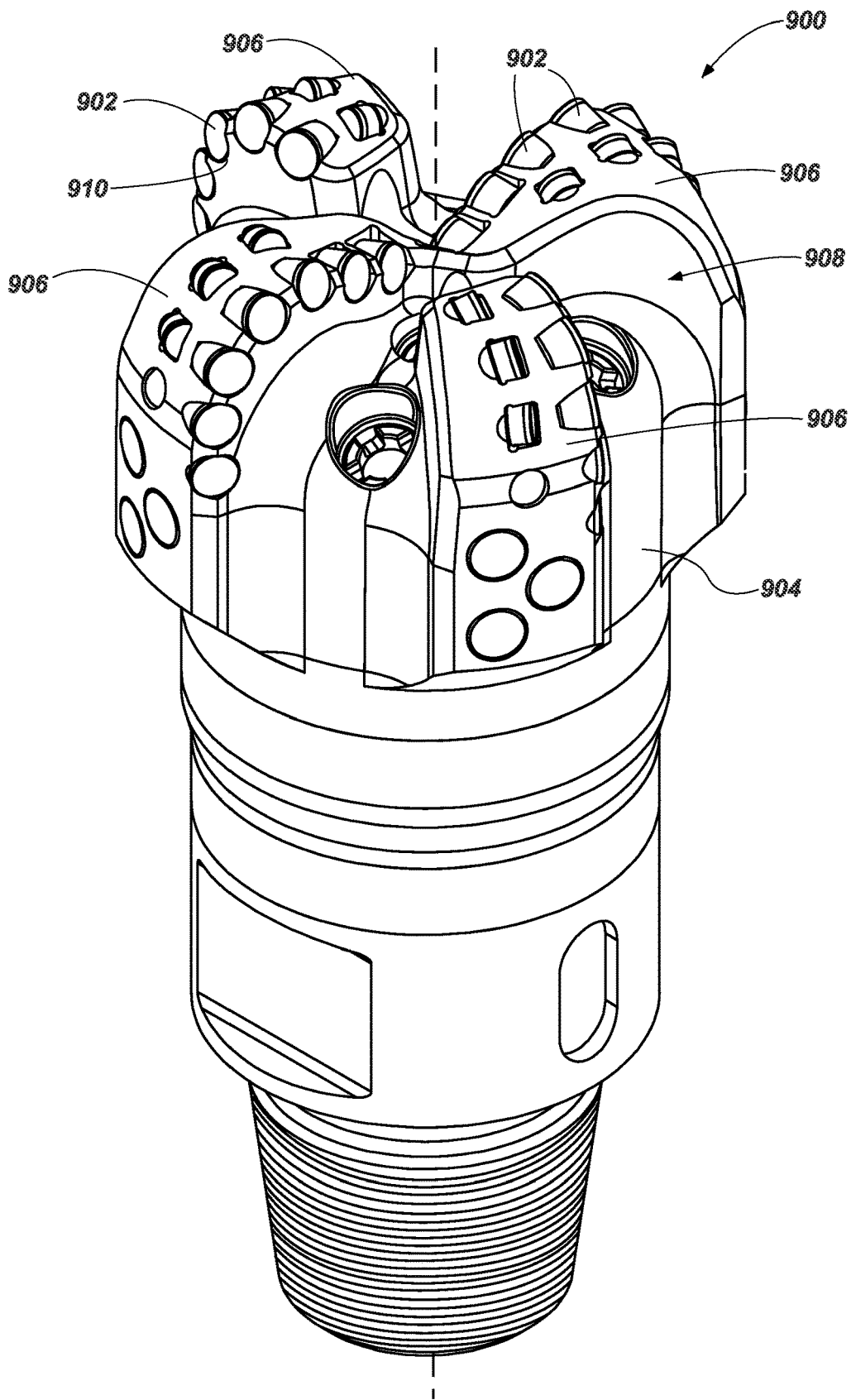
FIG. 7 is a perspective view of an earth-boring tool including one or more cutting elements, according to embodiments of the disclosure.

FIG. 7 is a perspective view of an earth-boring tool 900, including one or more cutting elements 902 (e.g., cutting elements 222, 414, 500, 600, 700, 800) in accordance with this disclosure. The earth-boring tool 900 may include a body 904 to which the cutting element(s) 902 may be secured. The earth-boring tool 900 specifically depicted in FIG. 8 is configured as a fixed-cutter earth-boring drill bit, including blades 906 projecting outward from a remainder of the body 904 and defining junk slots 908 between rotationally adjacent blades 906. In such an embodiment, the cutting element(s) 902 may be secured partially within pockets 910 extending into one or more of the blades 906 (e.g., proximate the rotationally leading portions of the blades 906 as primary cutting elements 902, rotationally following those portions as backup cutting elements 902, or both). However, cutting elements 902 as described herein may be bonded to and used on other types of earth-boring tools, including, for example, roller cone drill bits, percussion bits, core bits, eccentric bits, bicenter bits, reamers, expandable reamers, mills, hybrid bits, and other drilling bits and tools known in the art.

Embodiments of the present disclosure further include:

Embodiment 1

A method of forming a cutting element, the method comprising: performing a first sintering process comprising sintering discrete diamond particles at a temperature of at least about 1400° C. under a pressure of at least about 10 GPa in the absence of a metal solvent catalyst to form direct diamond-to-diamond bonds between the discrete diamond particles so as to form a polycrystalline diamond compact; providing a barrier material over at least a portion of the polycrystalline diamond compact; providing a carbide material and a metal binder comprising at least one transition metal element over the barrier material and the polycrystalline diamond compact; and performing a second sintering process comprising sintering the carbide material, the metal binder, the barrier material, and the polycrystalline diamond compact at a temperature of at least about 1400° C. under a pressure of at least about 5 GPa to form a supporting substrate comprising the carbide material and the metal binder attached to the polycrystalline diamond compact, the binder material between the polycrystalline diamond compact and the supporting substrate, wherein at least a portion of the polycrystalline diamond compact proximate an exposed exterior surface of the polycrystalline diamond compact is at least substantially free of the metal binder.

Embodiment 2

The method of embodiment 1, wherein providing the barrier material over at least a portion of the polycrystalline diamond compact comprises depositing the barrier material over at least the portion of the polycrystalline diamond compact by a thermal spray coating process, a chemical vapor deposition process, and/or an electrochemical deposition process.

Embodiment 3

The method of embodiment 2, wherein the barrier material comprises one or more of tantalum, rhenium, tungsten, iridium, hafnium, niobium, molybdenum, titanium, and zirconium, wherein the barrier material at least substantially prevents infiltration of the catalytic binder into the cutting table.

Embodiment 4

The method of embodiment 2, wherein the barrier material comprises a non-catalytic material comprising one or more of platinum, copper, lead, silver, and gold.

Embodiment 5

The method of embodiment 1 or embodiment 2, wherein the entirety of the polycrystalline diamond compact is at least substantially free of the metal binder.

Embodiment 6

The method of embodiment 1 or embodiment 2, wherein at least a portion of the metal binder infiltrates interstitial spaces in at least a portion of the polycrystalline diamond compact on a side thereof adjacent the carbide material during the second sintering process.

Embodiment 7

The method of any one of embodiments 1 through 6, wherein the carbide material comprises one or more of discrete carbide particles, and/or sintered carbide particles comprising carbide particles bonded together by the metal binder.

Embodiment 8

The method of any one of embodiments 1 through 7, wherein a thickness of the polycrystalline diamond compact and a thickness of the supporting substrate vary along an interface region between the polycrystalline diamond compact and the supporting substrate.

Embodiment 9

A cutting element for an earth-boring tool, comprising: a cutting table comprising a polycrystalline diamond compact including inter-bonded diamond particles with interstitial regions between the inter-bonded diamond particles, at least a volume of the cutting table adjacent an exterior cutting surface thereof being at least substantially free of a metal solvent catalyst in the interstitial regions in the volume; a supporting substrate comprising a carbide material and a metal binder including a metal solvent catalyst sintered in situ to the cutting table; and a barrier material between the supporting substrate and the cutting table.

Embodiment 10

The cutting element of embodiment 9, wherein an interface region between the supporting substrate and the cutting table is non-planar.

Embodiment 11

The cutting element of embodiment 10, wherein the supporting substrate comprises one or more protrusions at the interface region, and the cutting table comprises one or more corresponding complementary recesses at the interface region.

Embodiment 12

The cutting element of any one of embodiments 9 through 11, wherein the supporting substrate comprises sidewalls at least substantially surrounding at least a portion of the cutting table or wherein the cutting table comprises sidewalls at least substantially surrounding at least a portion of the supporting substrate.

Embodiment 13

The cutting element of any one of embodiments 9 through 12, wherein a ratio of a thickness of the cutting table to a thickness of the supporting substrate is within a range extending from about 0.05 to about 5.

Embodiment 14

The cutting element of any one of embodiments 9 through 13, wherein the barrier material at least substantially extends along an entirety of an interface region between the cutting table and the supporting substrate.

Embodiment 15

An earth-boring tool, comprising: a tool body; and a cutting element according to any one of embodiments 9 through 14 secured to the tool body.

Embodiment 16

A method of forming a polycrystalline diamond compact, the method comprising: providing discrete diamond particles; providing a barrier material over at least a portion of the discrete diamond particles; providing a carbide material and a metal binder over the barrier material; and sintering the carbide material, the metal binder, the barrier material, and the discrete diamond particles at a temperature of at least about 1400° C. under a pressure of at least about 10 GPa to form direct diamond-to-diamond bonds between the discrete diamond particles so as to form a polycrystalline diamond compact attached to a supporting substrate comprising the carbide material and the metal binder, the barrier material between the polycrystalline diamond compact and the supporting substrate, wherein at least a portion of the polycrystalline diamond compact proximate an exposed exterior surface of the polycrystalline diamond compact is at least substantially free of the metal binder.

Embodiment 17

The method of embodiment 16, wherein the entirety of the polycrystalline diamond compact is at least substantially free of the metal binder.

Embodiment 18

The method of embodiment 16 or embodiment 17, wherein the carbide material comprises one or more of tungsten carbide, titanium carbide, vanadium carbide, silicon carbide, and tantalum carbide.

Embodiment 19

The method of any one of embodiments 16 through 18, wherein the barrier material at least substantially prevents infiltration of the metal binder into the polycrystalline diamond compact.

Embodiment 20

The method of any one of embodiments 16 through 19, wherein the barrier material comprises one or more of tantalum, rhenium, tungsten, iridium, hafnium, niobium, molybdenum, titanium, zirconium, platinum, copper, lead, silver, and gold.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A method of forming a polycrystalline diamond compact, the method comprising:

performing a first sintering process comprising sintering discrete diamond particles at a temperature of at least about 1400° C. at a pressure of at least about 10 GPa in the absence of a metal solvent catalyst to form direct diamond-to-diamond bonds between the discrete diamond particles so as to form a polycrystalline diamond compact;

providing a barrier material over at least a portion of the polycrystalline diamond compact;

providing a carbide material and a metal binder comprising at least one transition metal element over the barrier material and the polycrystalline diamond compact; and performing a second sintering process comprising sintering the carbide material, the metal binder, the barrier material, and the polycrystalline diamond compact at a temperature of at least about 1400° C. at a pressure of at least about 5 GPa in the absence of a metal solvent catalyst to form a supporting substrate comprising the carbide material and the metal binder attached to the polycrystalline diamond compact, the barrier material located between the polycrystalline diamond compact and the supporting substrate, wherein at least a portion of the polycrystalline diamond compact proximate an exposed exterior surface of the polycrystalline diamond compact is at least substantially free of the metal binder.

2. The method of claim 1, wherein providing the barrier material over at least a portion of the polycrystalline diamond compact comprises depositing the barrier material over at least the portion of the polycrystalline diamond compact by a thermal spray coating process, a chemical vapor deposition process, an electrochemical deposition process, or a combination thereof.

3. The method of claim 2, wherein the barrier material comprises one or more of tantalum, rhenium, tungsten, iridium, hafnium, niobium, molybdenum, titanium, and zirconium, and wherein the barrier material at least substantially prevents infiltration of the metal binder into a cutting table of the polycrystalline diamond compact.

4. The method of claim 2, wherein the barrier material comprises a non-catalytic material comprising one or more of platinum, copper, lead, silver, and gold.

5. The method of claim 1, wherein all of the polycrystalline diamond compact is at least substantially free of the metal binder.

6. The method of claim 1, wherein at least a portion of the metal binder infiltrates interstitial spaces in at least a portion of the polycrystalline diamond compact on a side thereof adjacent the carbide material during the second sintering process.

7. The method of claim 1, wherein the carbide material comprises discrete carbide particles, sintered carbide particles comprising carbide particles bonded together by the metal binder, or a combination thereof.

8. The method of claim 1, wherein a thickness of the polycrystalline diamond compact and a thickness of the supporting substrate vary along an interface region between the polycrystalline diamond compact and the supporting substrate.

9. A method of forming a polycrystalline diamond compact, the method comprising:

providing discrete diamond particles;

providing a barrier material over at least a portion of the discrete diamond particles;

providing a carbide material and a metal binder over the barrier material; and sintering the carbide material, the metal binder, the barrier material, and the discrete diamond particles in the absence of a metal solvent catalyst at a temperature of at least about 1400° C. at a pressure of at least about 10 GPa to form direct diamond-to-diamond bonds between the discrete diamond particles so as to form a polycrystalline diamond compact attached to a supporting substrate comprising the carbide material and the metal binder, the barrier material located between the polycrystalline diamond compact and the supporting substrate, wherein at least a portion of the polycrystalline diamond compact proximate an exposed exterior surface of the polycrystalline diamond compact is at least substantially free of the metal binder.

10. The method of claim 9, wherein all of the polycrystalline diamond compact is at least substantially free of the metal binder.

11. The method of claim 9, wherein the carbide material comprises one or more of tungsten carbide, titanium carbide, vanadium carbide, silicon carbide, and tantalum carbide.

12. The method of claim 9, wherein the barrier material at least substantially prevents infiltration of the metal binder into the polycrystalline diamond compact.

13. The method of claim 9, wherein the barrier material comprises one or more of tantalum, rhenium, tungsten, iridium, hafnium, niobium, molybdenum, titanium, zirconium, platinum, copper, lead, silver, and gold.

* * * * *